United States Patent [19]

Nakamoto

[11] Patent Number: 4,915,328

[45] Date of Patent: Apr. 10, 1990

[54] CONTROL METHOD OF ELECTRIC VEHICLE

[75] Inventor: Noriaki Nakamoto, Hyogo, Japan

[73] Assignee: Mitsubishi Denki Kabushiki Kaisha, Tokyo, Japan

[21] Appl. No.: 304,032

[22] Filed: Jan. 31, 1989

[30] Foreign Application Priority Data

Apr. 5, 1988 [JP] Japan .................................. 63-82274

[51] Int. Cl.$^4$ ............................ B60T 8/58; B61L 3/14
[52] U.S. Cl. ................................. 246/186; 246/182 C;
246/182 R; 246/187 R; 303/100
[58] Field of Search ............... 246/186, 187 R, 182 C, 246/182 R, 182 A, 182 B; 303/94, 97, 99, 95, 100, 105, 108, 109

[56] References Cited

PUBLICATIONS

"Electric Rolling Stocks" RAILWAY, vol. 40, No. 3, Mar. 1987, pp. 26–36.

*Primary Examiner*—Andres Kashnikow
*Assistant Examiner*—Mark T. Le
*Attorney, Agent, or Firm*—Oblon, Spivak, McClelland, Maier & Neustadt

[57] ABSTRACT

A control method of an electric vehicle in which a frictional contact of rotating or stationary wheels of the electric vehicle to a rail road is recovered again when the wheels are in a slipping condition which is determined by a variable concerning rotation of the wheels exceeding a detection level which is determined by a sum of an instructed vehicle acceleration and a gradient acceleration determined by an inclination of the rail road.

4 Claims, 2 Drawing Sheets

CONTROL METHOD OF ELECTRIC VEHICLE

BACKGROUND OF THE INVENTION

The present invention relates to a control method of an electric vehicle for restricting a slippage of rotating or stationary wheels of the vehicle with respect to a rail road and, particularly, such method by which a reliability of detection of the slippage is improved.

An example of known control methods is disclosed in "Electric Vehicle Science", Journal of Electric Vehicle Research Organization, 1987, March, page 30 (FIG. 15). The control method disclosed therein comprises a detection of rotation frequency of a rotary shaft of an induction motor controlled by a VVVF inverter, i.e., wheels of a vehicle, a generation of a slip signal or glide signal when a differentiation of the rotation frequency exceeds a constant detection level, a reduction of slip frequency which determines a frequency of the VVVF inverter and a restriction of the slippage.

For example, when a driving force given by the induction motor to the wheels during power running control exceeds a maximum driving force (without slippage), the rotation frequency of the induction motor increases abruptly due to slippage. A VVVF inverter control device produces a slip signal when the differentiation of the rotation frequency exceeds a predetermined detection level upon which the slip frequency is reduced to reduce an output torque of the induction motor to thereby recover an optimum friction of the wheels to the rails. Similarly, for a slippage during braking control, the friction of the wheels to the rails is recovered again by reducing the slip frequency to restrict a braking force.

It has been known, however, that the time differentiation of the rotation frequency depends upon rail road condition along which the vehicle runs. For example, when the vehicle runs along a down-hill rail road during power running control, the time differentiation increases. On the contrary, it is reduced when the vehicle runs along an up-hill rail road.

Since the conventional control method of electric vehicle detects a slippage condition on the basis of a constant detection level, there is a case where a non-slip condition is detected as a slippage or an actual slipping condition can not be detected when the vehicle runs along an inclined rail road.

SUMMARY OF THE INVENTION

An object of the present invention is to provide a control method of electric vehicle capable of detecting exactly and reliably an actual slippage.

According to the present invention, a detection level is changed according to a sum of a vehicle acceleration and an acceleration due to inclination so that the detection level is corrected correspondingly to an actual acceleration of the vehicle to improve the reliability of detection of slippage.

DETAILED DESCRIPTION OF THE PREFERRED EMBODIMENT

Figure 2:
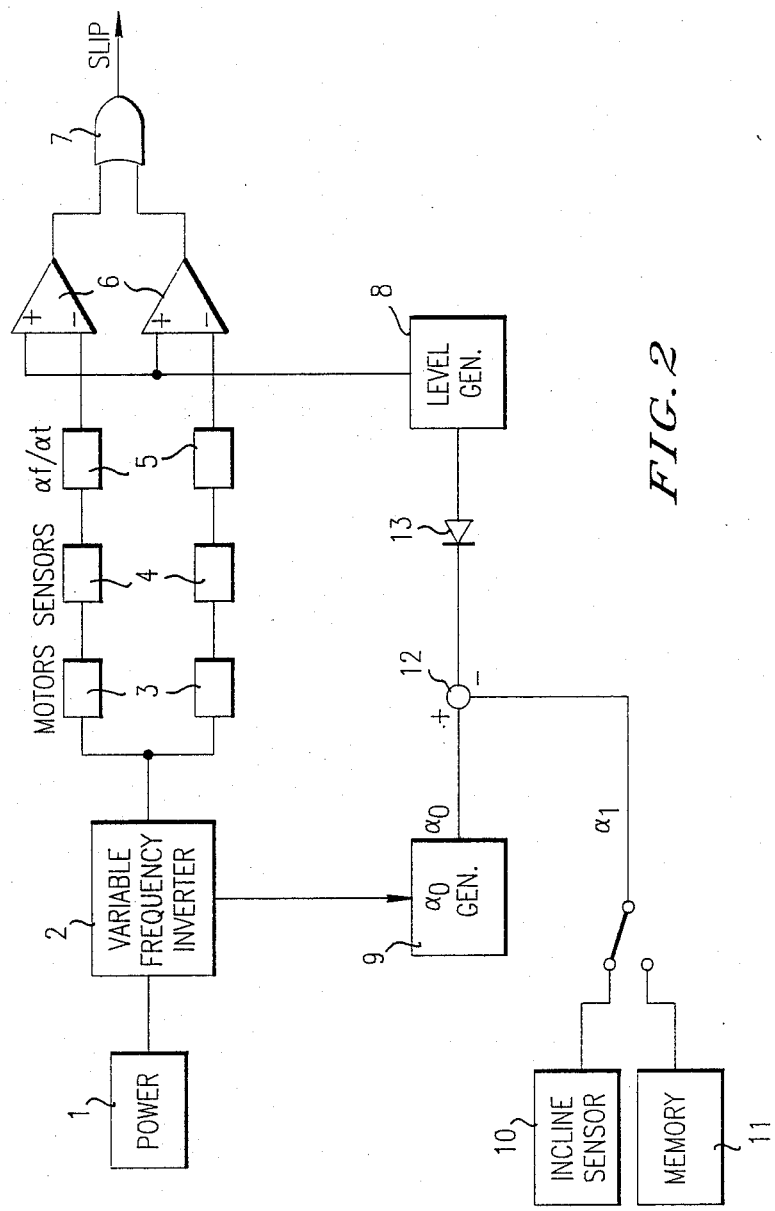
FIG. 2 is a block diagram of the apparatus of the present invention.

A more complete appreciation of the invention and many of the attendant advantages thereof will be readily obtained as the same becomes better understood by reference to the following detailed description when considered in connection with the accompanying drawings, wherein FIG. 2 shows a block diagram of the present invention. A power supply 1 produces electrical power to drive the motors of the vehicle. Variable frequency inverter 2 receives the generated power and produces a variable voltage, variable frequency output. This inverter is controlled by the engineer who can control the speed of the vehicle by controlling the inverter. The output of the inverter is received by the various motors 3 which drive the vehicle. While two motors are shown, in practice, more motors may be supplied, such as one for each wheel.

A sensor is attached to each motor for detecting the rotational speed of the wheels. One sensor is provided for each motor. The signal from the sensors is differentiated to provide a signal df/dt in circuit 5. This signal indicates a change in the rotational speed of the wheels. This signal is compared to a threshold level in comparators 6. The threshold level is generated by level generator 8. If the change in the rotational speed exceeds this threshold, an output is given from the various comparators. These signals are gated in circuit 7 to produce an indication of a slipping situation. The arrangement described so far in regard to elements 1–8 is shown in the prior art.

Rather than producing a permanently fixed level, level generator 8 is able to vary the level depending on the slope encountered by the vehicle. A first signal, $\alpha_0$ is generated by generator 9 based on an input from the variable frequency inverter. Thus, this signal determines the level of vehicle acceleration based on the control set by the engineer and by the power produced by the inverter. In other words, the electric motor of such a vehicle produces a constant acceleration on flat ground when the engineer selects a particular control level, and thus the inverter produces a certain level of power. A specific torque is produced in response to such a setting. A slip frequency can be determined based on this torque. It is then possible to determine the inverter frequency such that the slip frequency is kept unchanged. As a result, the traction force is proportional to the slip frequency, when the inverter frequency is equal to the rotational frequency of the motor plus the slip frequency. By making the inverter frequency equal to the frequency of the motor the desired traction force can be obtained.

When a vehicle moves down an incline, it tends to speed up even though the control is set at a constant position due to the acceleration of gravity. Specifically, the inclination acceleration $\alpha_1$ is well known to be: $\alpha_1 = g \times \sin \theta$. It is clear that when a vehicle moves downhill or uphill the threshold level must be adjusted to compensate for this or erroneous indications of slip will be detected. Thus, an incline sensor 10 which determines the angle of slope, $\theta$, produces a signal which is subtracted from $\alpha_0$ to compensate for the acceleration due to motion on an incline. Alternatively, a memory 11 which stores data indicative of such an incline may instead by used. Subtractor 12 combines the $\alpha_0$ signal with the $\alpha_1$ to produce a signal which determines the threshold level in the level generator 8. A maximum value limiting circuit 13 is used to limit the maximum value of the signal.

Figure 1:
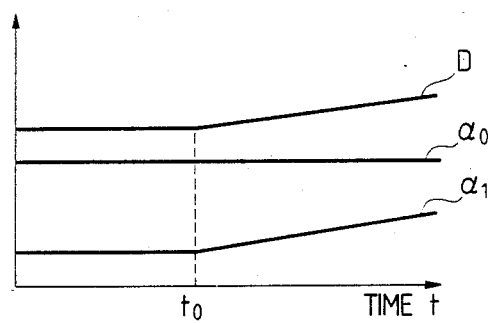
FIG. 1 is an explanatory graph showing a variation of detection level according to an embodiment of the present invention.

The use of different threshold levels of the present invention will be described with reference to the drawing. FIG. 1 shows a time variation of a slip detection level obtained by the present invention, in which $\alpha_0$ is a vehicle acceleration corresponding to an instruction value given to an induction motor, $\alpha_1$ is a gradient acceleration corresponding to an inclination of a rail road and D is a slip detection level which varies according to a sum of the vehicle acceleration $\alpha_0$ and the gradient acceleration $\alpha_1$.

For example, during power running control, the vehicle acceleration $\alpha_0$ which is determined by a driving instruction of vehicle is constant. However, assuming that the rail road becomes down-hill at a time instance $t_0$ and a gradient thereof increases gradually, the gradient acceleration $\alpha_1$ increases with time. The gradient acceleration may be preliminarily set as a rail road information or detected time to time by a suitable detector which is not shown.

The slip detection level D, in this case, is a sum ($\alpha_0 + \alpha_1$) of the vehicle acceleration $\alpha_0$ and the gradient acceleration $\alpha_1$ which increases in the same manner as that of the gradient acceleration $\alpha_1$. Therefore, an erroneous detection of slippage is avoided since the detection level D increases even if the time differentiation of the rotation frequency of the induction motor.

For a case of up-hill rail road, the detection level D decreases since the gradient acceleration $\alpha_1$ becomes negative, and, therefore, a slippage can be detected reliably even if the time differentiation of the rotation frequency decreases.

On the other hand, since, during a braking control in a down-hill running, the vehicle acceleration $\alpha_0$ is negative, the gradient acceleration $\alpha_1$ causes an absolute value of the detection level D to be decreased, making the slip detection reliable. During a braking control in an up-hill running, the gradient acceleration $\alpha_1$ makes the detection level D higher, preventing an erroneous detection of slippage.

In this manner, even when the gradient of the rail road changes at the time instance $t_0$, the detection level D is corrected by the gradient acceleration $\alpha_1$. Therefore, it becomes possible to detect reliably and rapidly an occurence of slippage of the wheels.

Although, in the above mentioned embodiment, the slippage or gliding is detected according to the time differentiation of rotation frequency, i.e., an amount of acceleration, the same effect can be obtained by using a time differentiation of acceleration with a time differentiation of the vehicle acceleration $\alpha_0$ and a time differentiation of the gradient acceleration $\alpha_1$ being taken into consideration.

A driving means for driving the vehicle is not limited to the induction motor. Other motors can be used. Further, the restriction of slippage or gliding may be performed by other method than the reduction of slip frequency.

As mentioned, according to the present invention, the detection level of slippage is changed on the basis of the sum of the vehicle acceleration and the gradient acceleration so that it is corrected correspondingly to an actual acceleration of the vehicle. Therefore, the reliability of slip detection for the electric vehicle is improved.

What is claimed is:

1. A control method for an electric vehicle having wheels and frictional contact with rails, comprising the steps of:
   sensing the rotation of the wheels;
   producing a variable related to the sensed rotation of the wheels;
   comparing said variable to a detection level;
   determining the existence of a slip condition if said variable exceeds said level; and
   changing said detection level in accordance with the sum of the vehicle acceleration due to the rotation of driving motors and the vehicle acceleration due to the slope of the rails.

2. The control method as claimed in claim 1, wherein the acceleration due to the slope is provided as previously stored information.

3. The control method as claimed in claim 1, wherein the acceleration due to the slope is sensed by a slope measuring means.

4. The control method as claimed in any of claims 1 to 3, wherein said variable is a time differentiation of rotation frequency of said wheels.

* * * * *